United States Patent
Yeh et al.

(10) Patent No.: US 10,499,312 B2
(45) Date of Patent: Dec. 3, 2019

(54) SYSTEM AND CONNECTION METHOD OF A WIRELESS NETWORK

(71) Applicant: Quanta Computer Inc., Taoyuan (TW)

(72) Inventors: Chih-Tsang Yeh, Taoyuan (TW);
Yang-Sheng Wang, Taoyuan (TW);
Yu-Ching Chen, Taoyuan (TW);
Chin-Hua Hsu, Taoyuan (TW); Po-An Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 63 days.

(21) Appl. No.: 15/869,500

(22) Filed: Jan. 12, 2018

(65) Prior Publication Data

US 2019/0037470 A1 Jan. 31, 2019

(30) Foreign Application Priority Data

Jul. 25, 2017 (TW) .............................. 106124872 A (51) Int. Cl.
| | | |
|---|---|---|
| *H04W 40/24* | (2009.01) | |
| *H04W 72/12* | (2009.01) | |
| *H04W 40/28* | (2009.01) | |
| *H04W 40/34* | (2009.01) | |
| *H04W 40/12* | (2009.01) | |
| *H04W 84/18* | (2009.01) | |

(52) U.S. Cl.
CPC ......... *H04W 40/244* (2013.01); *H04W 40/12* (2013.01); *H04W 40/246* (2013.01); *H04W 40/28* (2013.01); *H04W 40/34* (2013.01); *H04W 72/1231* (2013.01); *H04W 84/18* (2013.01)

(58) Field of Classification Search
CPC . H04W 72/1231; H04W 84/18; H04W 40/12; H04W 40/244; H04W 40/246; H04W 40/28; H04W 40/34
See application file for complete search history.

(56) References Cited

U.S. PATENT DOCUMENTS

| | | | | |
|---|---|---|---|---|
| 8,149,715 B1* | 4/2012 | Goel | ..................... | H04L 45/123 370/238 |
| 8,717,969 B2* | 5/2014 | Lee | ....................... | H04L 5/1469 370/252 |
| 2006/0009189 A1* | 1/2006 | Kim | ..................... | H04B 7/0626 455/403 |
| 2006/0215556 A1* | 9/2006 | Wu | ........................ | H04W 4/12 370/230 |

(Continued)

*Primary Examiner* — Jenee Holland
(74) *Attorney, Agent, or Firm* — McClure, Qualey & Rodack, LLP (57) ABSTRACT

A wireless network system and a connection method for the wireless network are provided. A network device in the wireless network obtains the connecting route weights of a network base station and other network devices, the received signal strength indictor (RSSI) between the network device and the network base station, and the RSSIs between the network device and each of the other network devices. The network device obtains the routing decision values corresponding to the network base station and the other network devices and chooses the network base station or one of the other network devices corresponding to the highest routing decision value as the connection target. The network device can re-select its connection target according to environmental changes in the wireless network.

10 Claims, 9 Drawing Sheets

(56) References Cited

U.S. PATENT DOCUMENTS

| | | | | |
|---|---|---|---|---|
| 2007/0189225 A1* | 8/2007 | Qian | ................ | H04L 1/0002 |
| | | | | 370/332 |
| 2009/0285124 A1* | 11/2009 | Aguirre | ............ | H04L 45/122 |
| | | | | 370/255 |
| 2011/0267982 A1* | 11/2011 | Zhang | ............ | H04B 7/2606 |
| | | | | 370/256 |
| 2012/0129546 A1* | 5/2012 | Yang | ................ | G01S 5/0252 |
| | | | | 455/456.1 |
| 2015/0296388 A1* | 10/2015 | Bassiri | ............ | H04W 16/20 |
| | | | | 455/446 |
| 2016/0286452 A1* | 9/2016 | Tian | ................ | H04W 28/08 |
| 2017/0041845 A1* | 2/2017 | Ta | ................ | H04W 36/14 |
| 2017/0127312 A1* | 5/2017 | Kang | ................ | H04W 40/08 |
| 2018/0359678 A1* | 12/2018 | Jones | ................ | H04W 40/16 |

* cited by examiner

SYSTEM AND CONNECTION METHOD OF A WIRELESS NETWORK

CROSS REFERENCE TO RELATED APPLICATIONS

This Application claims priority of Taiwan Patent Application No. 106124872, filed on Jul. 25, 2017, the entirety of which is incorporated by reference herein.

BACKGROUND OF THE INVENTION

Field of the Invention

The present invention relates to a wireless network, and in particular it relates to a wireless network system and its connection method. Network devices in the wireless network system can reselect connection targets according to changes in the network environment to retain connections to a network base station.

Description of the Related Art

A wireless Mesh Network allows the network devices in the network to transmit data via dynamic routings. When a network device in the network loses its connection abilities, other network devices can choose other routes through which to proceed with data transmission. In this network, network devices are allowed to use a hopping method to transmit data, which transmits data to a preset destination via other network devices.

A network device in a wireless mesh network can choose from among a plurality of routes, but the communication conditions of each of the routes could be different and some of the routes may be disconnected and cannot be used for communication. Selection and maintenance of routes could affect the efficiency of the whole network.

BRIEF SUMMARY OF THE INVENTION

The present invention provides a wireless mesh network system and its establishing and maintenance method of dynamic routings. The wireless network system of the present invention comprises a network base station (AP) and a plurality of network devices ($N_1$~$N_n$). Each of the network devices ($N_x$, x=1~N) can connect to the network base station directly, or it can connect to the network base station indirectly via at least one of the other network devices ($N_k$, k≠x). Each of the network devices has a connecting route ($R_{x-x}$) that connects to the network base station directly, or it has a connecting route ($R_{x-k}$) that connects to the network base station indirectly. There is a connecting route weight ($W_{x-x}$ or $W_{x-k}$) that corresponds to the connecting route ($R_{x-x}$ or $R_{x-k}$). The wireless network system also comprises a first network device. The first network device obtains a plurality of received signal strength indictors ($RSSI_0$ and $RSSI_1$~$RSSI_n$) between the first network device and the network base station (e.g., $RSSI_0$) and each of the network devices (e.g., $RSSI_1$~$RSSI_n$), respectively. The first network device obtains routing decision values ($RW_0$ and $RW_1$~$RW_n$) corresponding to the network base station and each of the network devices, respectively, according to the received signal strength indictors ($RSSI_0$ and $RSSI_1$~$RSSI_n$) and the connecting route weights ($W_{x-x}$ and $W_{x-k}$). The first network device selects either the network base station or the network devices corresponding to the highest routing decision value of all the routing decision values ($RW_0$ and $RW_1$~$RW_n$) as a connection target.

The present invention also provides a wireless network connection method suitable for a wireless network comprising a network base station, a plurality of network devices ($N_1$~$N_n$), and a first network device. Each of the network devices ($N_x$, x=1~N) can connect directly to the network base station, or it can connect to the network base station indirectly via at least one of the other network devices ($N_k$, k≠x). The wireless network connection method comprises the following steps. Each of the network devices is assigned a connecting route ($R_{x-x}$) to connect to the network base station directly, or it is assigned a connecting route ($R_{x-k}$) to connect to the network base station indirectly, wherein there is a connecting route weight ($W_{x-x}$ or $W_{x-k}$) that corresponds to the connecting route ($R_{x-x}$ or $R_{x-k}$). The first network device obtains a plurality of received signal strength indictors ($RSSI_0$ and $RSSI_1$~$RSSI_n$) between the first network device and the network base station and each of the network devices, respectively. The first network device obtains routing decision values ($RW_0$ and $RW_1$~$RW_n$) corresponding to the network base station and each of the network devices, respectively, according to the received signal strength indictors ($RSSI_0$ and $RSSI_1$~$RSSI_n$) and the connecting route weights (Wx-x and $W_{x-k}$). The first network device selects either the network base station or the network devices corresponding to the highest routing decision value of all the routing decision values ($RW_0$ and $RW_1$~$RW_n$) as a connection target.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1A to FIG. 1D are connection-status diagrams of a wireless network system according to an embodiment of the present invention. The wireless network system 100 comprises a network base station AP, three network devices $N_1$, $N_2$ and $N_3$ and one first network device $N_4$ which expects to link the network base station AP. In this embodiment, the wireless network system 100 has four network devices $N_1$-$N_4$ for ease of depiction, but it is not limited to any fixed number.

In the wireless network system 100, each of the network devices $N_x$ (x=1~3) has either a connecting route ($R_{x-x}$) that connects to the network base station directly, or a connecting route ($R_{x-k}$) that connects to the network base station indirectly through the network devices $N_k$ (k≠x), and has a connecting route weight ($W_{x-x}$ or $W_{x-k}$) that corresponds to the connecting route ($R_{x-x}$ or $R_{x-k}$).

Figure 1A:
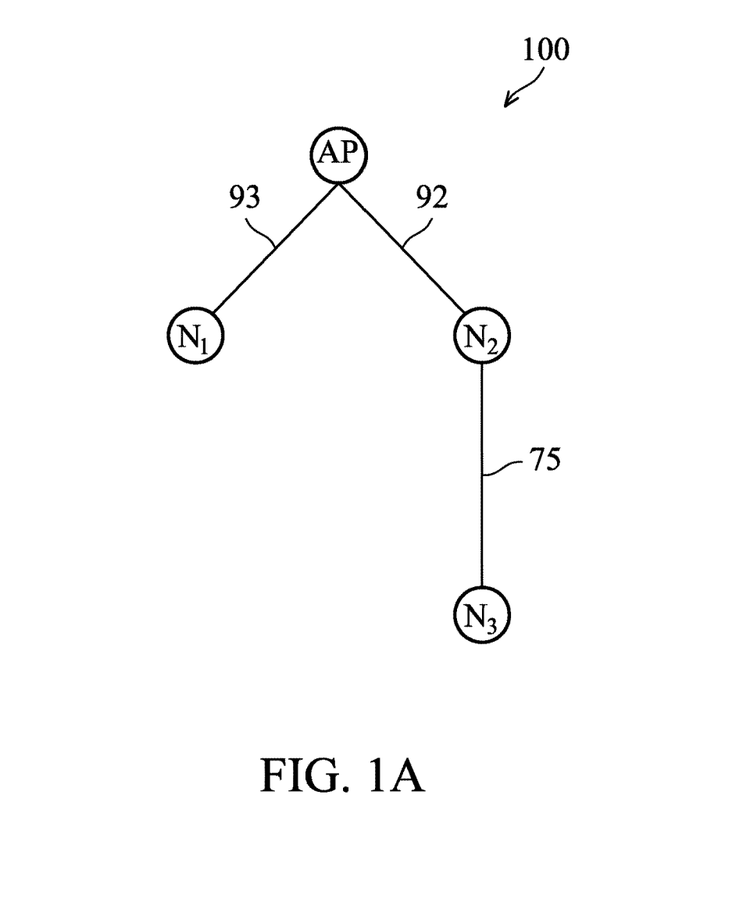
FIG. 1A to FIG. 1D are connection-status diagrams of a wireless network system according to an embodiment of the present invention.

Using the network device $N_1$ shown in FIG. 1A as an example, the network device $N_1$ has route $R_{1-1}$ if it is set to connect directly to the network base station AP. The network device $N_1$ has route $R_{1-2}$ (or $R_{1-3}$) if it is set to connect indirectly to the network base station AP via a network device $N_2$ (or $N_3$). In FIG. 1A, the network device $N_1$ has route $R_{1-1}$ and the network device $N_2$ has route $R_{2-2}$ since the network devices $N_1$ and $N_2$ are both set to connect directly to the network base station AP. Network device $N_3$ has route $R_{3-2}$ since it connects indirectly to the network base station AP via the network device $N_2$. The network devices $N_1$, $N_2$ and $N_3$ have connecting route weights $W_{1-1}$ $W_{2-2}$ and $W_{3-2}$ respective to routes $R_{1-1}$ $R_{2-2}$ and $R_{3-2}$. In one embodiment, if a network device connects directly to the network base station AP, the connecting route weight of the network device is (or corresponds to) the value of the received signal strength indictor (RSSI) between the network device and the network base station AP.

The received signal strength indictors are obtained via receiving pilot packets from other network devices or the network base station AP. For example, the network device $N_1$ receives a pilot packet from the network base station AP and calculates the RSSI corresponding to the network base station AP according to the pilot packet.

The first network device $N_4$ can connect to the network base station AP directly, or it can connect to the network base station AP indirectly via the network devices $N_1$, $N_2$ or $N_3$. The first network device $N_4$ can obtain received signal strength indictors $RSSI_0$ and $RSSI_1$~$RSSI_3$ between itself and the network base station AP and each of the network devices $N_1$-$N_3$, and the connecting route weights $W_{1-1}$ $W_{2-2}$ and $W_{3-2}$ of the network devices $N_1$, $N_2$ and $N_3$ and further calculate the routing decision values $RW_0$ and $RW_1$~$RW_3$ respective to network base station AP and network devices $N_1$~$N_3$. The first network device $N_4$ selects either the network base station AP or the network devices $N_1$~$N_3$ which correspond to (i.e. have) the highest routing decision value of all the routing decision values $RW_1$~$RW_3$ as its connection target.

As shown in FIG. 1A, the route $R_{3-2}$ of network device $N_3$ connects network device $N_3$ to network base station AP via the network device $N_2$. The connecting route weight $W_{3-2}$ of the network device $N_2$ is determined by $a \times RSSI_{3-2} + b \times W_{2-m}$, wherein $RSSI_{3-2}$ is the received signal strength indictor between the network device $N_3$ and the network device $N_2$, and $W_{2-m}$ is the connecting route weight of the network device $N_2$ which connects directly to the network base station AP or connects indirectly to the network base station AP via another network device ($N_m$, m≠2), and a+b=1. In this embodiment, a=⅔ and b=⅓, but the present invention is not limited to this combination. In this embodiment, the network device $N_2$ connects directly to the network base station AP without passing through another network device $N_m$ (e.g., $N_1$). Hence the connecting route weight $W_{2-m}$ is the received signal strength indictor between the network device $N_2$ and the network base station AP ($RSSI_2$), which can be further expressed as $W_{2-2}$ in this embodiment. From the description above, the connecting route weight $W_{3-2}$ of network device $N_3$ is set to be $a \times RSSI_{3-2} + b \times W_{2-2}$. For example, if the received signal strength indictor between the network device $N_2$ and the network base station AP ($RSSI_2$), which is also $W_{2-2}$, is 92 and $RSSI_{3-2}$ is 75, the connecting route weight of the network device $N_3$ is: $W_{3-2} = \frac{2}{3} \times RSSI_{3-2} + \frac{1}{3} \times W_{2-2} = \frac{2}{3} \times 75 + \frac{1}{3} \times 92 = 80.67$.

The network devices N1 and N2 connect to network base station AP directly and hence the connecting route weights $W_{1-1}$ and $W_{2-2}$ corresponding to the routes $R_{1-1}$ and $R_{2-2}$ are the received signal strength indictors $RSSI_1$ between the network device $N_1$ and the network base station AP and $RSSI_2$ between the network device $N_2$ and the network base station AP respectively. In this embodiment, $RSSI_1$=93 and $RSSI_2$=92.

Figure 1B:
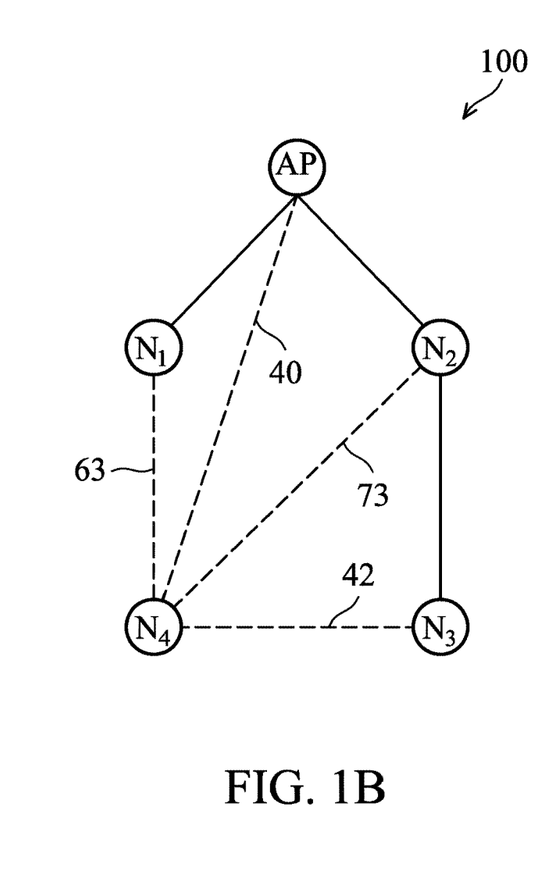

As shown in FIG. 1B, the first network device $N_4$ obtains the received signal strength indictors $RSSI_0$ and $RSSI_1$~$RSSI_3$ corresponding to the network base station AP and the network devices $N_1$~$N_3$ respectively (which are 40, 63, 73 and 42 respectively in this embodiment), calculates the routing decision values ($RW_0$ and $RW_1$~$RW_3$) corresponding to the network base station AP and the network devices $N_1$~$N_3$ according to the received signal strength indictors and the connecting route weights $W_{1-1}$, $W_{2-2}$ and $W_{3-2}$ (which are 93, 92, 80.67 respectively in this embodiment), and selects either the network base station AP or the network device $N_1$~$N_3$ which has the highest routing decision value of all the routing decision values ($RW_0$ and $RW_1$~$RW_1$) as its connection target.

The routing decision values ($RW_0$ and $RW_1$~$RW_3$) of the first network device $N_4$ corresponding to the network base station AP and network devices $N_1$~$N_3$ correspond to $a \times RSSI_x + b \times W_{x-k}$. As shown in FIG. 1B, $RW_0$ and $RW_1$~$RW_3$ are 40, 63, 73 and 42 respectively; the connecting route weights $W_{1-1}$, $W_{2-2}$ and $W_{3-2}$ are 93, 92, 80.67 respectively in this embodiment. Hence the routing decision values are obtained using the following calculations:

$$RW_0 = RSSI_0 = 40,$$

$$RW_1 = 2/3 \times RSSI_1 + 1/3 \times W_{1-1} = 2/3 \times 63 + 1/3 \times 93 = 73,$$

$$RW_2 = 2/3 \times RSSI_2 + 1/3 \times W_{2-2} = 2/3 \times 73 + 1/3 \times 92 = 79.33,$$

$$\begin{aligned}RW_3 &= 2/3 \times RSSI_3 + 1/3 \times W_{3-2}\\ &= 2/3 \times RSSI_3 + 1/3 \times (2/3 \times RSSI_{3-2} + 1/3 \times W_{2-2})\\ &= 2/3 \times 42 + 1/3 \times 80.67\\ &= 54.89.\end{aligned}$$

The highest routing decision value is $RW_2$ according to the results shown above and hence the first network device $N_4$ chooses network device $N_2$ as its connection target and further connects to the network base station AP via the network device $N_2$.

Figure 1C:
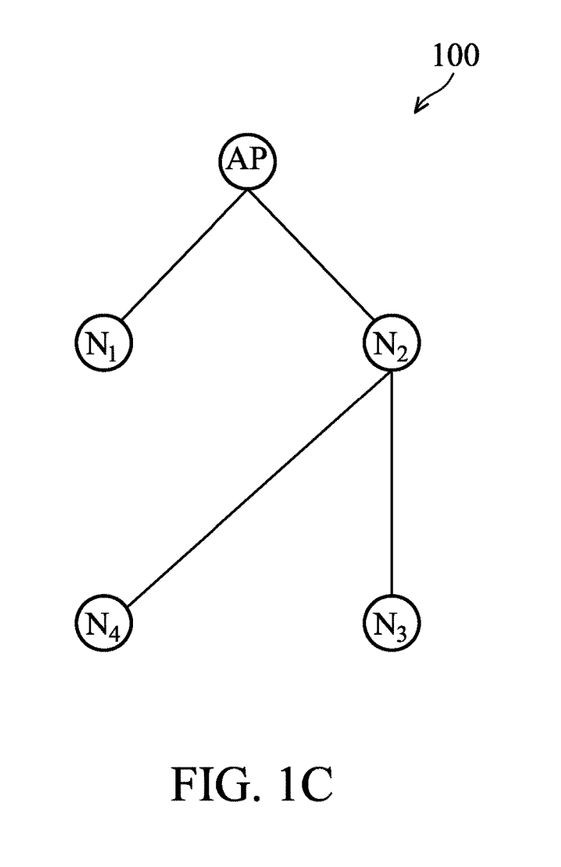

FIG. 1C is a connection-status diagram after the first network device $N_4$ connects to the network device $N_2$. The network devices $N_1$ and $N_2$ connect directly to the network base station AP and hence have routes $R_{1-1}$ and $R_{2-2}$, and connecting route weights $W_{1-1}$ and $W_{2-2}$ respectively. The network devices $N_3$ and $N_4$ connect indirectly to the network base station AP via the network device $N_2$ and hence have routes $R_{3-2}$ and $R_{4-2}$, and connecting route weights $W_{3-2}$ and $W_{4-2}$ respectively, wherein the value of connecting route weight $W_{4-2}$ is equal to the routing decision value of its corresponding connection target $RW_2=79.33$. Under this connection status, the network base station AP and the network devices $N_1$~$N_4$ form a wireless network system 100 with all routes being established and the network devices $N_1$~$N_4$ can also be the connection targets of other network devices. Hence if a second network device (not shown in figures) wants to connect to the network base station AP, the second network device can select either the network base station AP or the network devices $N_1$~$N_4$ as its connection target using the described method of how the first network device $N_4$ selects its connection target.

Figure 1D:
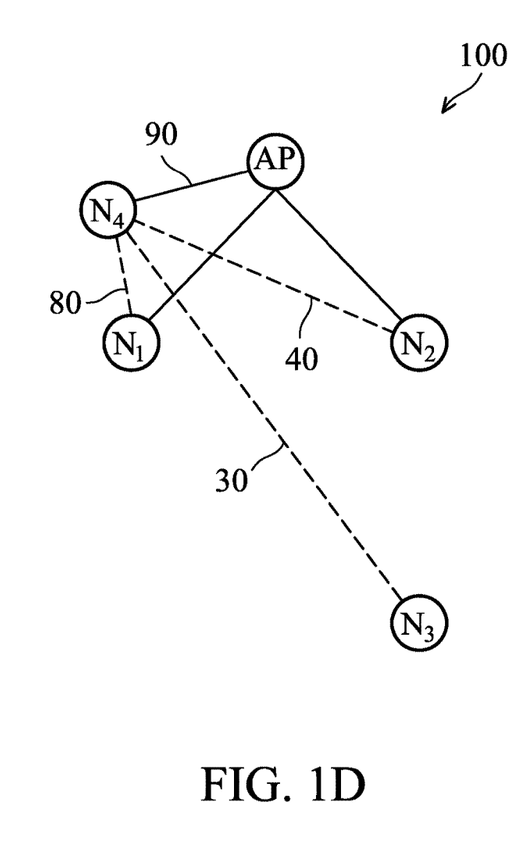

The wireless network system of the present invention can be a dynamic network wherein the network devices may change their geological locations and the number of network devices may also change. Moving the network devices would change the wireless channel environments of the routes, and changing the number of network devices would also add and eliminate routes in the network system. Hence the network devices in the present invention can actively reconnect to new connection targets when facing changes in the network environment like moving or the addition of new network devices. FIG. 1D shows an example system after the first network device $N_4$ of the example system in FIG. 1C changes its location. The first network device N4 in the example system of FIG. 1D could have a more suitable connection target and could reselect its connection target according to the method of the present invention.

In the example system of FIG. 1D, the connecting route weights of the network device $N_1$~$N_3$ are the same as the connecting route weights in the example system in FIG. 1A, which $W_{1-1}=93$, $W_{2-2}=92$ and $W_{3-2}=80.67$. The received signal strength indictors between the first network device $N_4$ and the network base station AP and the network device $N_1$~$N_3$ are $RSSI_0=90$, $RSSI_1=80$, $RSSI_2=40$, $RSSI_3=30$ respectively. Like the routing decision value calculation method described above, the routing decision values of the first network device N4 corresponding to the network base station AP and the network devices $N_1$~$N_3$ in FIG. 1D are:

$RW_0=RSSI_0=90$, $RW_1=(\frac{2}{3})\times RSSI_1+(\frac{1}{3})\times W_{1-1}=(\frac{2}{3})\times 80+(\frac{1}{3})\times 93=84.33$, $RW_2=(\frac{2}{3})\times RSSI_2+(\frac{1}{3})\times W_{2-2}=(\frac{2}{3})\times 40+(\frac{1}{3})\times 92=57.33$, $RW_3=(\frac{2}{3})\times RSSI_3+(\frac{1}{3})\times W_{3-2}=(\frac{2}{3})\times 30+(\frac{1}{3})\times 80.67=46.89$.

Hence, in the exemplary system in FIG. 1D, the first network device chooses the network base station AP as its new connection target.

Figure 2:
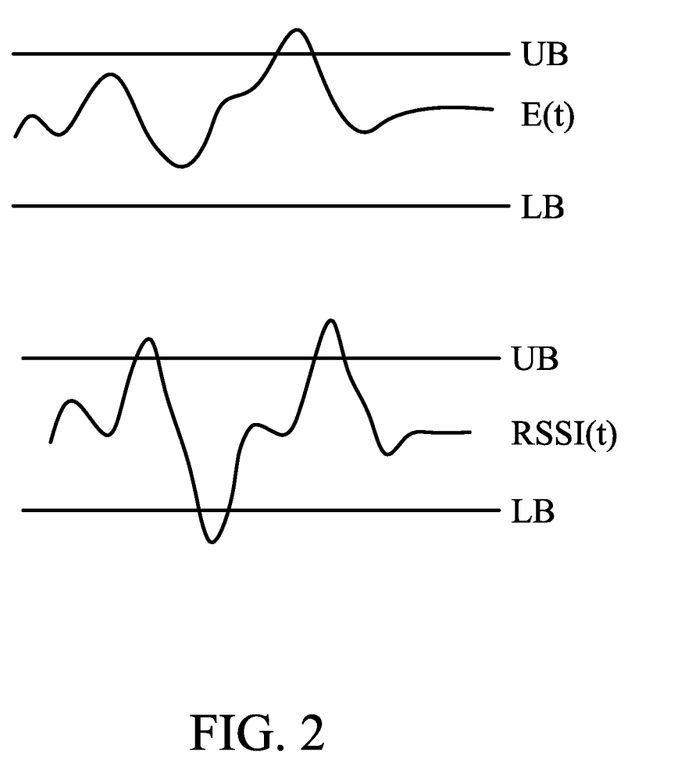
FIG. 2 is a comparison example of the sum of the current received signal strength indictors RSSI(t) and its moving average EA(t).

In one embodiment, the first network device $N_4$ can determine whether to recalculate the routing decision values to decide the new connection target by an average of the sum of the received signal strength indictors ($RSSI_0$~$RSSI_3$). The first network device $N_4$ can calculate the exponential moving average of the sum of received signal strength indictors $EA(t)=\alpha \times EA(t-1)+(1-\alpha)\alpha RSSI(t)$, where $EA(t-1)$ is the exponential moving average of the previous calculation, $RSSI(t)$ is the sum of received signal strength indictors at the current time and a is a constant with value between 0 and 1. If the exponential moving average $EA(t)$ of first network device $N_4$ is greater than an upper bound UB or smaller than a lower bound LB, e.g., higher or lower than a predetermined percentage, the first network device $N_4$ recalculates all routing decision values and selects a new connection target. The advantage of using exponential moving connecting route weights is that it considers the current and previous status of the system as the criteria for whether to reselect the connection target and it can avoid the frequent reselection of connection targets that occurs when solely using $RSSI(t)$. The effect of outdated information in the exponential moving average decays exponentially over time and it prevents the outdated information from having too much of an effect. FIG. 2 shows a comparison of the sum of received signal strength indictors $RSSI(t)$ at the current time and its exponential moving average $EA(t)$. FIG. 2 shows that merely using $RSSI(t)$ as the criteria for reselecting the connection target would result in over-frequent reselections of the connection target due to the fact that $RSSI(t)$ often surpasses the upper bound UB and the lower bound LB. Using exponential moving average $EA(t)$ can reduce the frequency of reselecting the connection target while still precisely determining the substantial changes in the sum of the received signal strength indictors.

In one embodiment of the present invention, when the received signal strength indictor $RSSI_x$ between the first network device $N_4$ and a network device $N_x$ is smaller than a threshold, first network device $N_4$ eliminates the network device $N_x$ as its connection target. From the teaching above, we know that the routing decision value $RW_x$ of the first network device N4 corresponding to the network device Nx can be obtained via the received signal strength indictor $RSSI_x$ of first network device $N_4$ corresponding to network device $N_x$ and the connecting route weight $W_{x-k}$ (or $W_{x-x}$) of the network device Nx. But a low received signal strength indictor $RSSI_x$ between the first network device $N_4$ and the network device $N_x$ indicates the poor quality of the wireless channel between the first network device $N_4$ and the network device $N_x$, and hence excellent connecting route weight $W_{x-k}$ (or $W_{x-x}$) still cannot guarantee the quality of the overall route. Hence the network device $N_x$ is eliminated as the connection target of the first network device $N_4$.

In one embodiment of the present invention, when a network device, such as $N_2$, is in a state of error, the first network device $N_4$ eliminates the network device $N_2$ as its connection target. A network device in a state of error may still be able to connect to the network base station AP, but this may also contain other risks, e.g., the network device $N_2$ may be controlled by a malicious user, and using the network device $N_2$ as a connection target comes with security and privacy risks, and hence the network device $N_2$ is not suitable as a connection target.

Figure 3:
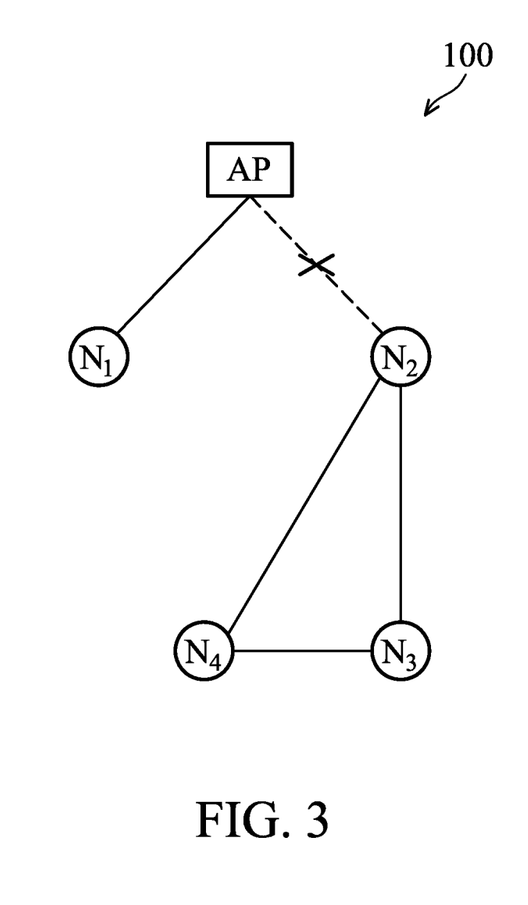
FIG. 3 is an example of a network device unable to connect to a network base station in a wireless network system.

FIG. 3 shows an example of a network device which fails to connect to a network base station in a wireless network system. The connecting routes in the wireless network system of FIG. 3 are similar to the connecting routes in the wireless network system of FIG. 1C, but the network device $N_2$ loses its connection to the network base station AP and may chose the network device $N_3$ as its connection target after recalculating its routing decision values. Network device $N_3$ uses network device $N_4$ as its new connection target. In above situation, if the network device $N_4$ still uses network device $N_2$ as its connection target after recalculation, a closed loop is formed. In this closed loop, the network devices $N_2$~$N_4$ all have connection targets for packet transmission, but the packets only circulate within the loop and cannot reach the network base station AP. If the network device $N_4$ selects the network device $N_1$ or the network base station AP as its connection target, this problem is solved. Hence, a network device which loses its connection to the network base station cannot be selected as a connection target.

Figure 4:
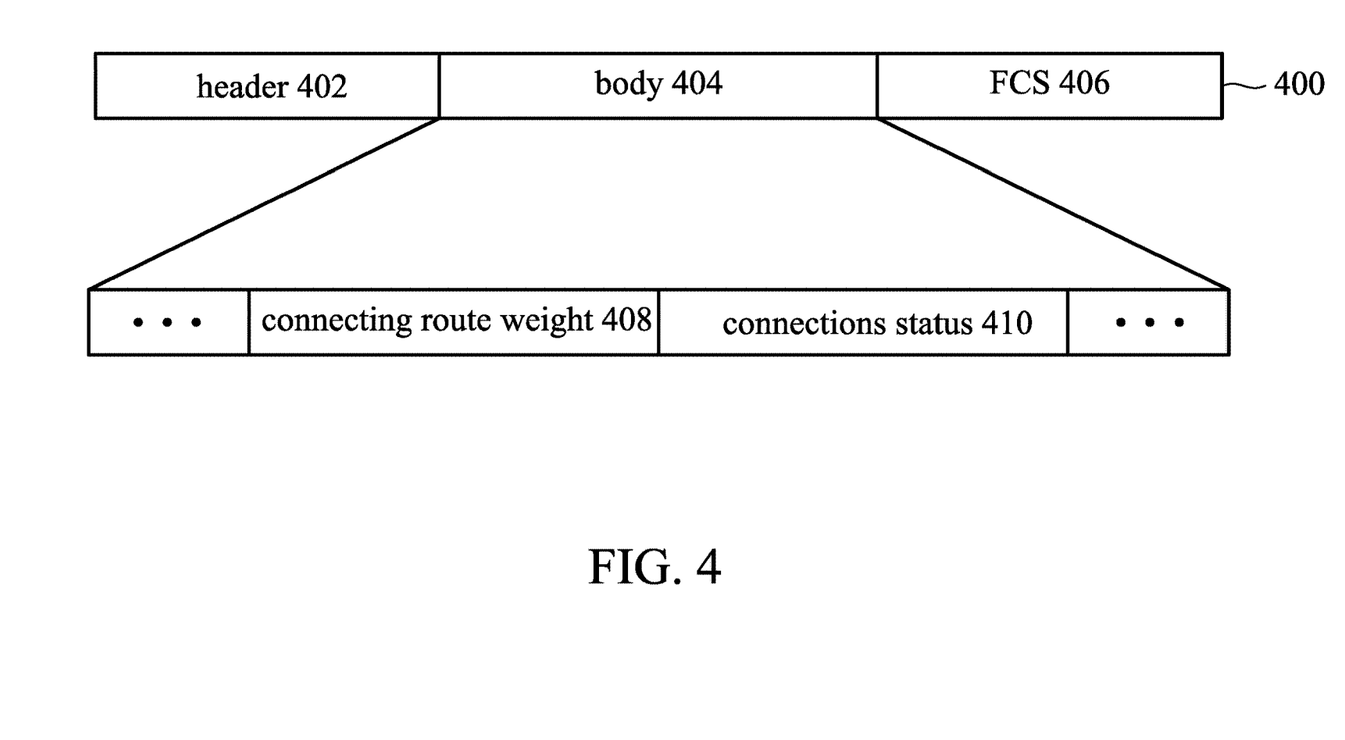
FIG. 4 is a diagram of the WiFi BEACON package of the present invention.

The network devices ($N_1$~$N_3$, $N_4$) and the network base station (AP) of the wireless network system (such as the system of FIG. 1A) according to the present invention can broadcast packets periodically, e.g. BEACON packets under the WiFi standard, to deliver updated information about the network base station or the network devices to the network devices in the network system. Every BEACON packet transmitted by each of the network devices $N_x$ includes information, e.g., the connection status of the network device $N_x$ and the network base station, the connecting route of the network device $N_x$ to the network base station, and the connecting route weight of the of the network device $N_x$. FIG. 4 illustrates the WiFi BEACON packet of the present invention. Packet 400 includes a header 402, a Body 404, and a Frame Check Sequence (FCS) 406. The Body 404 can further include a connecting route weight 408 and a connection status 410. A network device cannot be set as a connection target when the connection status 400 of its BEACON packet shows that it cannot connect to the network base station. For example, when the first network device $N_4$ receives a BEACON packet 400 from the network device $N_2$ and further notices that network device $N_2$ cannot connect to the base station AP according to the connection status 410 of the Body 404, the first network device $N_4$ eliminates the network device $N_2$ as its connection target.

Figure 5:
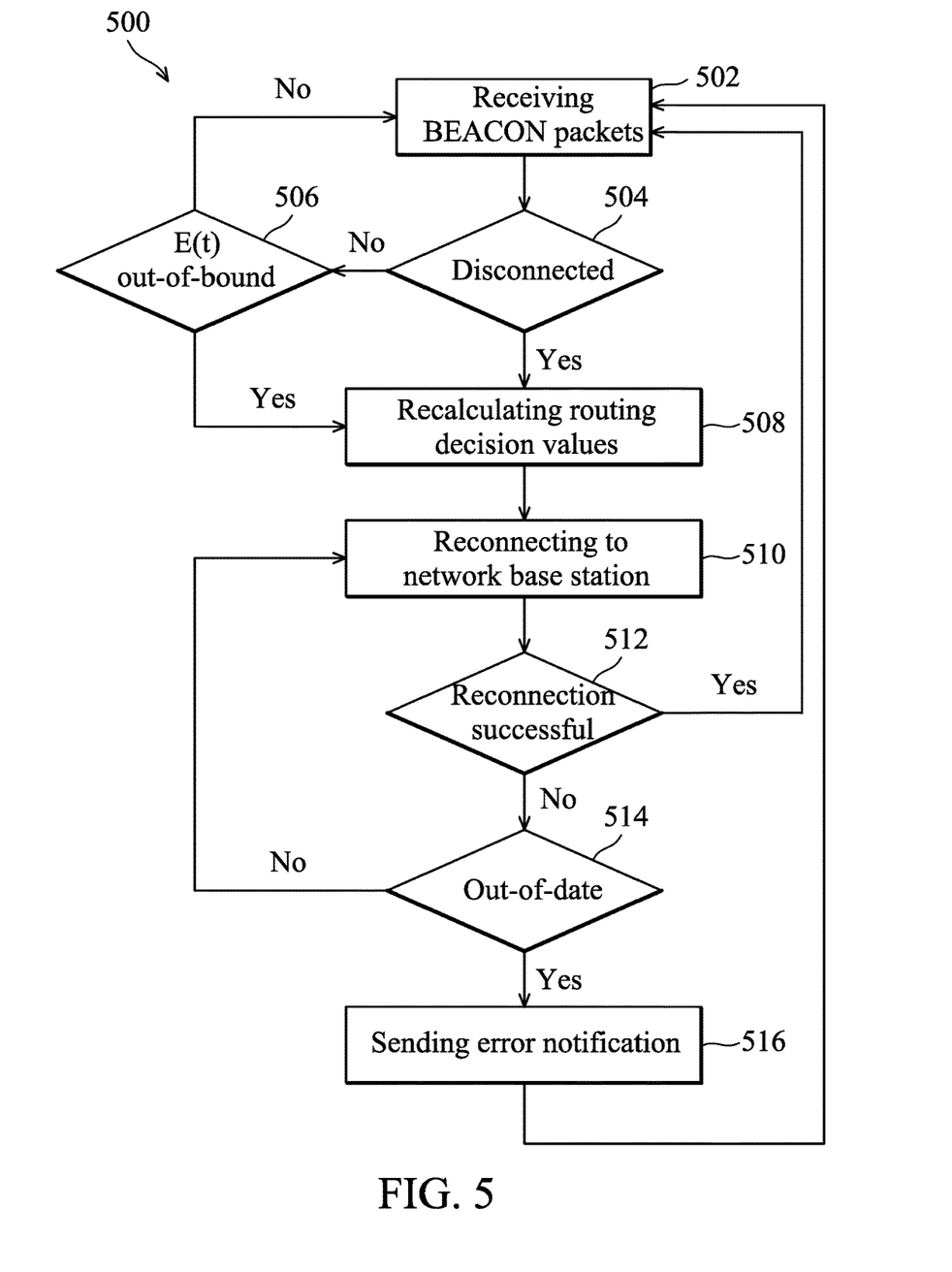
FIG. 5 depicts the connection method of an embodiment of the present invention.

FIG. 5. Shows the connection method of the present invention where the network devices can adjust or update the connection status according to the status changes of the network system. The wireless connection method 500 of this embodiment is used in a wireless network system, e.g., the wireless network system shown in FIG. 1C. First, in step 502, a network device (e.g., first network device $N_4$) periodically receives the BEACON packets from the network base station AP and the other network devices ($N_1 \sim N_3$).

In step 504, the first network device $N_4$ determines whether it can connect to the network base station AP via the BEACON packet from its original connection target. In this embodiment, the first network device $N_4$ determines whether the network device $N_2$ can connect to the network base station AP according to the connection status of the BEACON packet from the network device $N_2$. If the network device $N_2$ can connect to the network base station AP, the first network device $N_4$ goes to step 506. If the determination shows that the network device $N_2$ cannot connect to the network base station AP, the first network device $N_4$ goes to step 508.

In step 506, the first network device $N_4$ calculates the exponential moving average (E(t) in FIG. 2) of the sum of all received signal strength indictors. If the exponential moving average is greater than the upper bound UB or smaller than the lower bound LB, the first network device $N_4$ goes to step 508. If the exponential moving average falls in between the upper bound UB and the lower bound LB, it means that the first network device $N_4$ does not need to reselect its connection target and it goes back to step 502 to wait for the updated BEACON packets at the next predetermined time.

In step 508, the first network device $N_4$ recalculates the routing decision values ($RW_0$, $RW_1 \sim RW_3$) corresponding to the network base station AP and the network devices $N_1 \sim N_3$ according to the method described above. The first network device $N_4$ further selects either the network base station AP or the network devices $N_1 \sim N_3$ corresponding to the largest routing decision value as the connection target.

In step 510, the first network device $N_4$ reconnects to the network base station AP. In step 512, the first network device examines whether the connection is successful. If the connection is successful, the first network device $N_4$ goes back to step 502 to wait for the next BEACON packets. If the connection is not successful, the first network device $N_4$ goes to step 514.

In step 514, the first network device N4 checks whether the reconnection has expired. An expired reconnection includes: the number of attempted reconnections exceeding a predetermined value, or the duration of time since the first reconnection was attempted being longer than a predetermined value. If the first network device N4 determines that the reconnection has not expired, it goes back to step 510. If the first network device N4 determines that the reconnection has expired, it goes to step 516.

In step 516, the first network device $N_4$ determines that it cannot connect to the network base station AP and further sets the connection status as disconnected in its following broadcast BEACON packets. The first network device $N_4$ can also send out error notifications in hardware or software formats, e.g., Error indicator light on the device surface or software notifications, to inform users that the first network device $N_4$ has lost its capability of connecting to the network base station AP. The first network device $N_4$ further goes back to step 502 to wait for the updated BEACON packets at the next predetermined time.

Figure 6A:
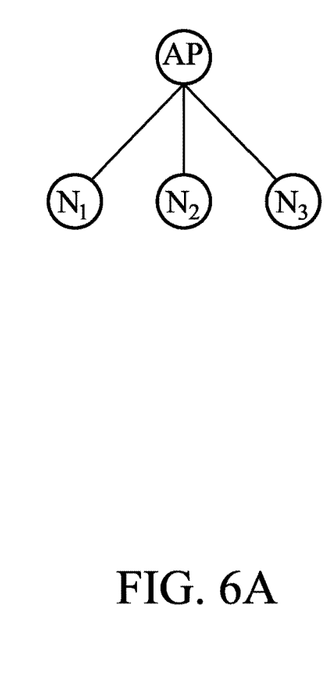
FIG. 6A to FIG. 6H are connection-status diagrams depicting the connection method of the present invention.

FIG. 6A to FIG. 6H are connection-status diagrams of a network system based on the connection method of the present invention. In the figures, the calculations of the routing decision values and connecting route weights are omitted and only the connection statuses after establishing the routes are shown. FIG. 6A shows the initial state of the wireless network, which includes a network base station AP and three wireless network devices $N_1$, $N_2$ and $N_3$, and the connection targets of network device $N_1$, $N_2$ and $N_3$ are the network base station AP.

Figure 6B:
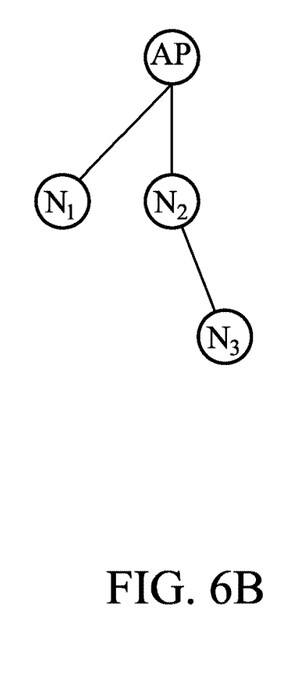

If the network device $N_3$ in FIG. 6A moves to a new location, the network device $N_3$ can reselect its connection target according to the connection method of the present invention (the disclosures in FIG. 1A to FIG. 1C or the method 500 of the present invention described above). For example, the network device $N_3$ is connected to the network base station AP by connecting the network device $N_2$ according to the connection method of the present invention. The updated connection-status diagram of the wireless network is shown in FIG. 6B.

If a network device $N_4$ is added to the wireless network system of FIG. 6A, the network device N4 selects its connection target after obtaining the routing decision values according to the connection method of the present invention (FIG. 1A~1C, FIG. 5). For example, the network device N4 selects the network base station AP as its connection target and the updated connection-status diagram of the wireless network is shown in FIG. 6C.

Figure 6C:
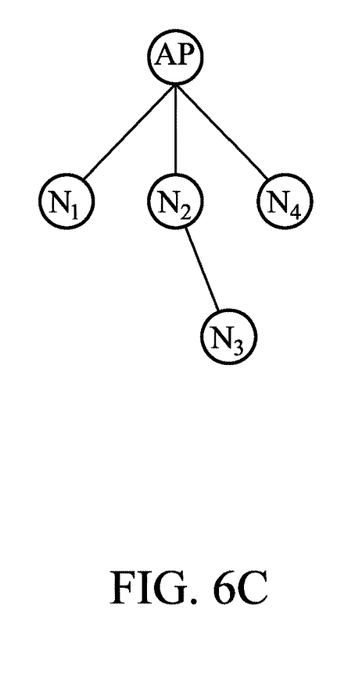

If the network device $N_4$ in FIG. 6C moves to a new location, the network device $N_4$ reselects its connection target according to the connection method of the present invention. For example, the network device $N_4$ selects the network device $N_2$ as its connection target and the updated connection-status diagram of the wireless network is shown in FIG. 6D.

Figure 6D:
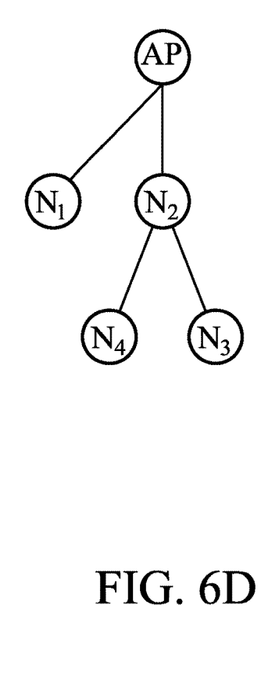

If network device $N_4$ in FIG. 6D moves further to another new location, the network device $N_4$ reselects its connection target according to the connection method of the present invention. For example, the network device $N_4$ selects the network device $N_3$ as its connection target and the updated connection-status diagram of the wireless network is shown in FIG. 6E.

Figure 6E:
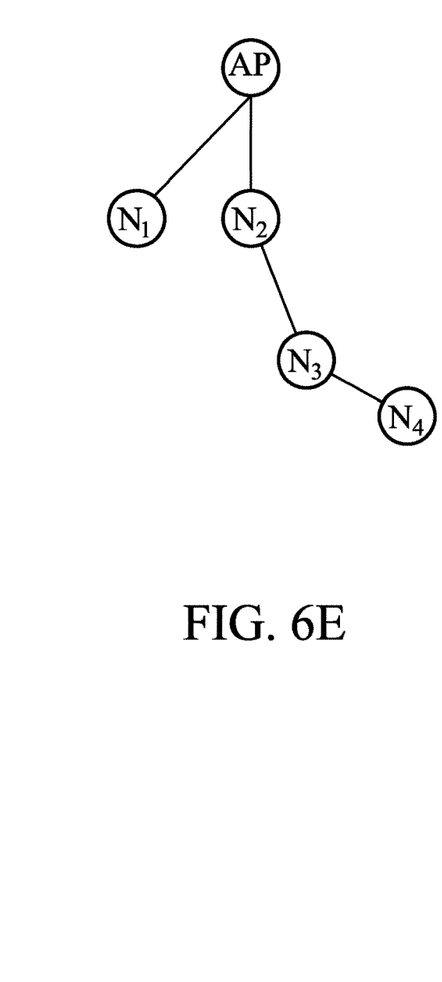
Figure 6F:
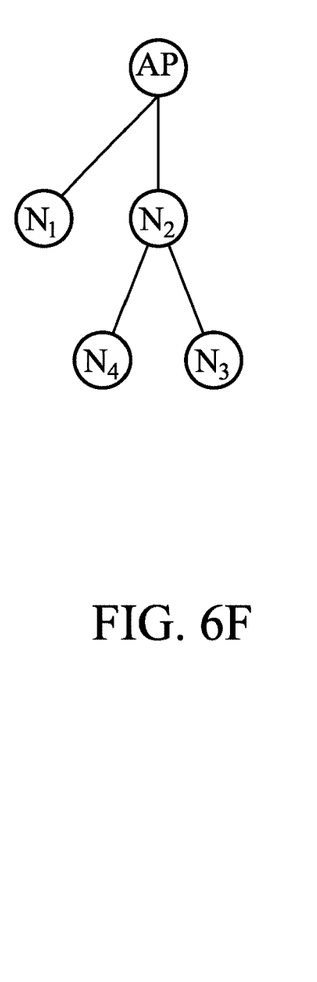

If the network device $N_4$ in FIG. 6E moves back to its original location shown in FIG. 6D, the network device $N_4$ reselects its connection target according to the connection method of the present invention. For example, the first network device $N_4$ may again select the network device $N_2$ as its connection target and the updated connection-status diagram of the wireless network is shown in FIG. 6F. The wireless network in FIG. 6F is the same as the wireless network in FIG. 6D.

If the network device $N_2$ in FIG. 6F cannot connect to the network base station AP or it is removed from the network system, the network devices $N_3$ and $N_4$, which originally connected to the network base station AP via network device $N_2$, can reselect their connection targets according to the connection method of the present invention. For example, the network devices $N_3$ and $N_4$, can select the network base station AP and the network device $N_1$ as their connection target respectively, and the updated connection-status diagram of the wireless network is shown in FIG. 6G.

Figure 6G:
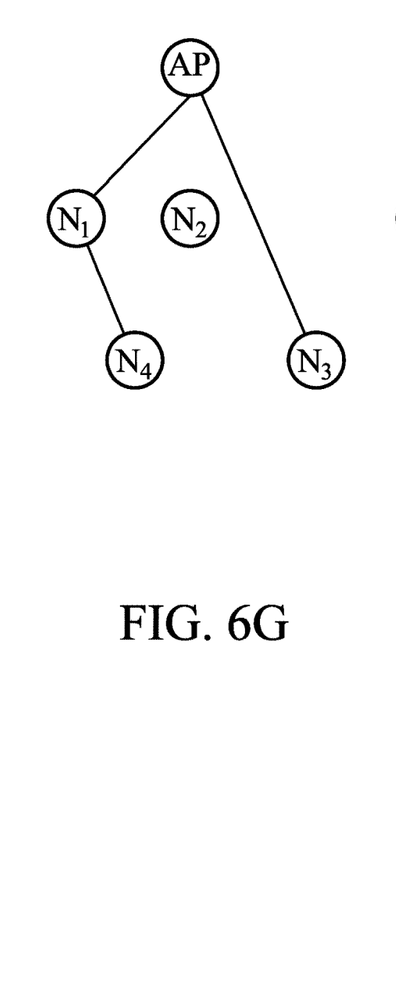
Figure 6H:
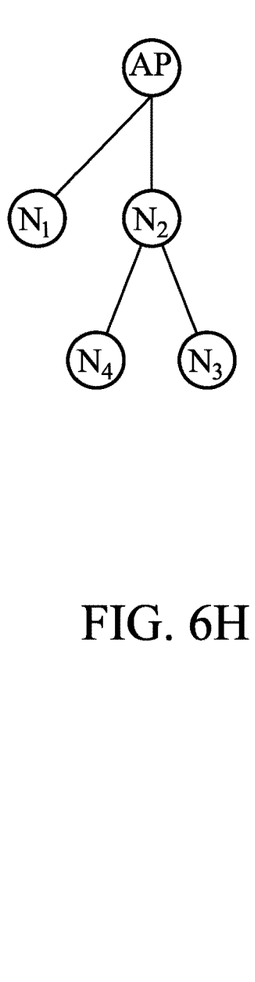

When network device $N_2$ in FIG. 6G regains its connection capability, it can select its new connection target according to the connection method of the present invention. For example, the network device $N_2$ can select the network base station AP as its connection target. The network devices $N_3$ and $N_4$ can reselect their connection targets via receiving the updated BEACON packets according to the connection method of the present invention. For example, both the network devices $N_3$ and $N_4$ select the network device $N_2$ as their connection targets and the updated connection-status diagram of the wireless network is shown in FIG. 6H. The wireless network in FIG. 6H is the same as the wireless network in FIG. 6F.

Figure 7:
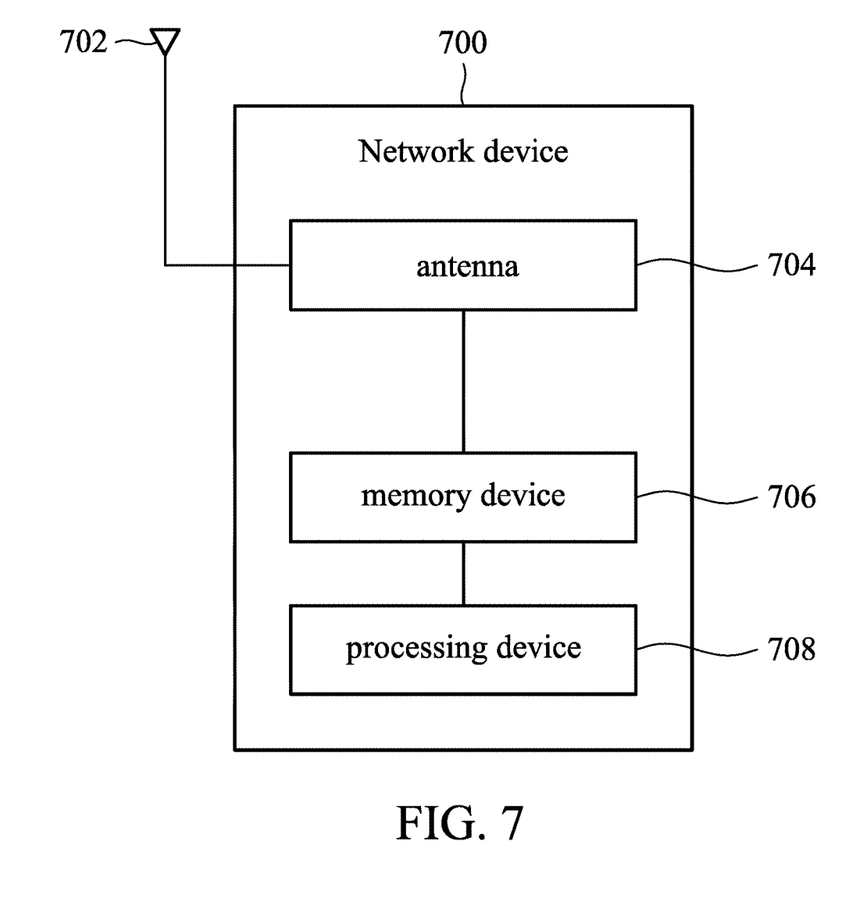
FIG. 7 is an exemplary circuit diagram of a network device of the present invention.

FIG. 7 shows the circuit diagram of a network device according to an embodiment of the present invention. In this embodiment, network device 700 includes an antenna 702, a transceiver 704, a processing device 706 and a memory device 708. Via the antenna 702, the transceiver 704 can transmit BEACON packets, signals, information and related message/information to other network devices, or receive BEACON packets, signals, information and related message/information from other network devices. The memory Device 708 can store configuration data, connection- and route-related data, and other information about the network device 700. The processing device 706, such as a central processing unit, a microcontroller or an embedded controller, etc., enables the network device 700 to perform the described wireless network connecting method of the present invention and communicate with other network devices or network base stations via its hardware structure or loading certain predetermined software. The memory device 708 is used to store the configuration information, BEACON packet information and receiving BEACON packets information from other network devices. The BEACON packet information can include information such as, but not limited to, routes, routing decision values, and connecting route weights.

The network device of the present invention can be an electric device with wireless network functions, including but not limited to: wireless network routers, smartphones, personal digital assistants, portable computers, tablet computers, personal computers, server computers, smart home appliances with wireless network functions, etc.

The network base station of the present invention includes, but is not limited to: modems with wireless network functions, wireless access points, wireless routers, mobile communication network base stations, smell cell network base stations, micro cell network base stations, etc.

The wireless network standard of the wireless network system of the present invention includes, but is not limited to: WiFi, Bluetooth, Infrared, Long Term Evolution (LTE), WiMAX, WCDMA, CDMA 2000, Near Field Communication (NFC), ZigBee and other known wireless network standards.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network system, comprising:
a network base station;
a plurality of network devices ($N_1 \sim N_n$), wherein each of the network devices ($N_x$, x=1~N) can connect to the network base station directly, or connect to the network base station indirectly via at least one of the other network devices ($N_k$, k≠x); wherein each of the network devices ($N_x$) has a connecting route ($R_{x-x}$) connected to the network base station directly, or a connecting route ($R_{x-k}$) connected to the network base station indirectly, and has a connecting route weight ($W_{x-x}$ or $W_{x-k}$) that corresponds to the connecting route ($R_{x-x}$ or $R_{x-k}$);
a first network device, obtaining a plurality of received signal strength indictors ($RSSI_0$ and $RSSI_1 \sim RSSI_n$) between the first network device and the network base station (AP) and each of the network devices ($N_x$), respectively; obtaining routing decision values ($RW_0$ and $RW_1 \sim RW_n$) corresponding to the network base station and each of the network devices, respectively, according to the received signal strength indictors ($RSSI_0$ and $RSSI_1 \sim RSSI_n$) and the connecting route weights ($W_{x-x}$ and $W_{x-k}$); and selecting either the network base station or the network devices corresponding to the highest routing decision value of all the routing decision values ($RW_0$ and $RW_1 \sim RW_0$) as a connection target; and
wherein the first network device continuously obtains the received signal strength indictors ($RSSI_0$ and $RSSI_1 \sim RSSI_n$) corresponding to the network base station (AP) and the network devices ($N_1 \sim N_n$), when an average of sum of the received signal strength indictors is larger than a predetermined upper limit or smaller than a predetermined lower limit, the first network device re-obtains the routing decision values and selects either the network base station (AP) or the network devices ($N_1 \sim N_n$) which correspond to the highest routing decision value as the connection target.

2. The wireless network system as claimed in claim 1, wherein when one ($N_x$) of the network devices ($N_1 \sim N_n$) is connected to the network base station via one of the other network devices ($N_k$, k≠x) according to its corresponding connecting route $R_{x-k}$; the connecting route weight ($W_{x-k}$) of the network device ($N_x$) corresponds to $a \times RSSI_{x-k} + b \times W_{k-m}$; $RSSI_{x-k}$ is a received signal strength indictor between the network device ($N_x$) and the other network device ($N_k$); $W_{k-m}$ is the connecting route weight of the other device ($N_k$) which connects to the network base station directly or connects to the network base station indirectly via another network device ($N_m$, m≠x); and a+b=1;
wherein a routing decision value ($RW_x$) of the first network device with respect to the network device ($N_x$) corresponds to $a \times RSSI_x + b \times W_{x-k}$; $RSSI_x$ is the received signal strength indictor of the first network device corresponding to the network device ($N_x$).

3. The wireless network system as claimed in claim 1, wherein when one ($N_x$) of the network devices ($N_1$~$N_n$) connects to the network base station directly according to its connecting route ($R_{x-x}$), and the connecting route weight ($W_{x-x}$) of the network device ($N_x$) corresponds to the received signal strength indictor between the network device ($N_x$) and the network base station;
  wherein the routing decision value of the first network device with respect to the network device ($N_x$) corresponds to $a*RSSI_x+b*W_{x-x}$, $RSSI_x$ is the received signal strength indictor of the first network device corresponding to the network device ($N_x$), and $a+b=1$.

4. The wireless network system as claimed in claim 1, wherein the average is an exponential moving average of the sum of the received signal strength indictors ($RSSI_0$ and $RSSI_1$~$RSSI_n$).

5. The wireless network system as claimed in claim 1, wherein a wireless network standard used by the wireless network is WiFi, and BEACON packages of the WiFi standard of the network devices preserve fields for recording connecting route weights and connection status to the network base station.

6. The wireless network system as claimed in claim 5, wherein for a target network device of the network devices, when the first network device detects that the received signal strength indictor between the first network device and the target network device is lower than a predetermined value, or detects that the target network device is functioning abnormally or cannot connect to the network base station via a BEACON packet from the target network device, the first network device eliminates the target network device as the connection target.

7. A wireless network connection method suitable for a wireless network comprising a network base station, a plurality of network devices ($N_1$~$N_n$), and a first network device, wherein each of the network devices ($N_x$, x=1~N) can connect directly to the network base station, or connect to the network base station indirectly via at least one of the other network devices ($N_k$, k≠x);
  the wireless network connection method, comprising:
    Assigning each of the network devices a connecting route ($R_{x-x}$) that connects to the network base station directly, or a connecting route ($R_{x-k}$) that connects to the network base station indirectly, wherein the connecting route weight ($W_{x-x}$ or $W_{x-k}$) corresponds to the connecting route ($R_{x-x}$ or $R_{x-k}$);
    obtaining a plurality of received signal strength indictors ($RSSI_0$ and $RSSI_1$~$RSSI_n$) between the first network device and the network base station and each of the network devices respectively via the first network device;
    obtaining routing decision values ($RW_0$ and $RW_1$~$RW_n$) corresponding to the network base station and each of the network devices respectively according to the received signal strength indictors ($RSSI_0$ and $RSSI_1$~$RSSI_n$) and the connecting route weights ($W_{x-x}$ and $W_{x-k}$) via the first network device;
    using the first network device to select either the network base station or the network devices corresponding to the highest routing decision value of all the routing decision values ($RW_0$ and $RW_1$~$RW_n$) as a connection target; and
    obtaining the received signal strength indictors ($RSSI_0$ and $RSSI_1$~$RSSI_n$) corresponding to the network base station and the network devices ($N_1$~$N_n$) continuously via the first network device, when an average of sum of the received signal strength indictors is larger than a predetermined upper limit or smaller than a lower limit, the first network device re-obtains the routing decision values and selects either the network base station or the network devices corresponding to the highest routing decision value as the connection target.

8. The wireless network connecting method as claimed in claim 7, wherein when the connecting route ($R_{x-k}$) of one of the network devices ($N_{x, x=1~N}$) is connected to the network base station via one of the other network devices ($N_k$, k≠x), the connecting route weight ($W_{x-k}$) of the network device ($N_x$) corresponds to $a*RSSI_{x-k}+b*W_{k-m}$; and $RSSI_{x-k}$ is the received signal strength indictor between the network device ($N_x$) and the other network device ($N_k$), and $W_{k-m}$ is the connecting route weight of the other device ($N_k$) which connects to the network base station directly or connects to the network base station indirectly via another network device ($N_m$, m≠x), and $a+b=1$;
  wherein the routing decision value (RWx) of the first network device to the network device (Nx) corresponds to $a*RSSI_x+b*W_{x-k}$; $RSSI_x$ is the received signal strength indictor of the first network device corresponding to the network device ($N_x$).

9. The wireless network connecting method as claimed in claim 7, wherein when one of the network devices ($N_x$, x=1~n) has a connecting route ($R_{x-x}$) connecting to the network base station directly, the connecting route weight ($W_{x-x}$) of the network device ($N_x$) corresponds to the received signal strength indictor between the network device ($N_x$) and the network base station;
  wherein the routing decision value of the first network device corresponding to the network device ($N_x$) corresponds to $a*RSSI_x+b*W_{x-x}$; $RSSI_x$ is the received signal strength indictor of the first network device corresponding to the network device ($N_x$), and $a+b=1$.

10. The wireless network connecting method as claimed in claim 8, wherein for a target network device of the network devices, when the first network device detects that the received signal strength indictor between the first network device and the target network device is lower than a predetermined value, or detects that the target network device is functioning abnormally or cannot connect to the network base station via a BEACON packet from the target network device, the first network device eliminates the target network device as the connection target.

* * * * *